(12) United States Patent
Smith

(10) Patent No.: US 6,784,916 B2
(45) Date of Patent: Aug. 31, 2004

(54) VIDEO CONFERENCING APPARATUS

(75) Inventor: Graham Thomas Smith, Toronto (CA)

(73) Assignee: Telbotics Inc., Toronto (CA)

( * ) Notice: Subject to any disclaimer, the term of this patent is extended or adjusted under 35 U.S.C. 154(b) by 62 days.

(21) Appl. No.: 10/068,902

(22) Filed: Feb. 11, 2002

(65) Prior Publication Data

US 2003/0151658 A1 Aug. 14, 2003

(51) Int. Cl.$^7$ ................................................. H04N 7/14
(52) U.S. Cl. .............................. 348/14.01; 348/14.16; 345/659
(58) Field of Search ........................ 348/14.01–14.16, 348/207.99, 207.1, 211.99, 211.1, 211.12, 211.13, 373; 345/659

(56) References Cited

U.S. PATENT DOCUMENTS

| | | | |
|---|---|---|---|
| 4,715,059 A | | 12/1987 | Cooper-Hart et al. |
| 5,218,627 A | * | 6/1993 | Corey et al. ............. 348/14.11 |
| 5,329,289 A | * | 7/1994 | Sakamoto et al. .......... 345/659 |
| 5,412,417 A | * | 5/1995 | Tozuka ..................... 348/14.01 |
| 5,612,733 A | * | 3/1997 | Flohr ....................... 348/14.16 |
| 5,768,163 A | * | 6/1998 | Smith, II ................... 348/373 |
| 6,137,526 A | * | 10/2000 | Kakii ....................... 348/14.16 |
| 6,335,753 B1 | * | 1/2002 | McDonald ................ 348/14.01 |

FOREIGN PATENT DOCUMENTS

| | | | | |
|---|---|---|---|---|
| EP | 0 898 424 A | | 2/1999 | |
| JP | 64009433 A | * | 1/1989 | ............ G03B/15/03 |
| JP | 11196397 A | * | 7/1999 | ............ H04N/7/14 |

OTHER PUBLICATIONS

Whybray M W et al.: "Videophony" British Telecom Technology Journal, London, GB, vol. 8, No. 3, Jul. 1, 1990, pp. 43–54, XP000601061; p. 43, r.h. col., I. 17–p. 44, I. h. col. I. 22, p. 44, r.h. col. I. 26–I, 54; Fig. 1.

* cited by examiner

*Primary Examiner*—Wing Fu Chan

(57) ABSTRACT

An apparatus and system for improving the projection of a remote conferee's presence and improving eye contact between the remote video conferee and proximate conferee during a videoconference is disclosed. The image of the remote conferee's face is shown on a video monitor with a camera located along the eye level of the image of the remote conferee's face, and within the interocular distance of about 1.5 inches to 3 inches. A feedback screen showing the image of the proximate video conferee is also located near the camera and preferably within the interocular distance. Because the camera is within the interocular distance the proximate conferee will appear, to the remote conferee, to be looking at the eyes of the remote conferee when looking at the monitor, because the camera is within the interocular distance. This will be accentuated when the proximate conferee uses the feedback image, which is near the camera. A rotation member can be provided to rotate the screen and camera from a regular position to a portrait position. The camera may be rotated about a ball joint to increase the remote conferee's view. The camera apparatus can also be in a form of a camera/monitor unit that can be placed on a video monitor, and preferably closer to the user than the monitor. The camera/monitor unit has a cover that can cover the camera when not in use. The inside surface of the cover has a reflective surface which, when the cover is in the open position, can reflect light from an illumination source located behind the monitor.

12 Claims, 7 Drawing Sheets

VIDEO CONFERENCING APPARATUS

FIELD OF THE INVENTION

This invention relates to an apparatus for facilitating videoconferencing between a proximate video conferee and a remote video conferee. In particular, the present invention provides a video conferencing apparatus that enhances the presence of the proximate conferee with respect to the remote conferee.

BACKGROUND OF THE INVENTION

Videoconferencing/teleconferencing has become an effective form of communication between distant conferees by allowing conferees to both hear and see each other. Furthermore, with the increase in globalization, it is often necessary for people separated by long distances to communicate frequently. Unfortunately, videoconferencing is not being utilized as effectively as it could be because of the inherent nature in which people communicate. In particular, when people communicate in person, they often focus on the facial features, and particularly the eyes of the other person. Conventional videoconferencing systems and apparatuses suffer from a lack of eye contact, which distracts from the videoconferencing experience.

In conventional teleconferencing systems, there is a video monitor displaying an image of the remote conferee and a camera capturing and transmitting an image of the proximate conferee to the remote conferee. However, the camera is generally located above or below the video monitor projecting the image of the proximate conferee. Because the proximate conferee is generally viewing the image of the remote conferee on the video monitor, the proximate conferee rarely looks into the camera, resulting in a lack of eye contact between the proximate conferee and the remote conferee. By contrast, during normal conversation, people tend to have a large amount of eye contact. Accordingly, lack of eye contact in conventional teleconferencing systems decreases the sense of personal contact and the sense of presence of the video conferees.

In addition, the placement of the video camera can have a psychological effect during the video conferencing session. For instance, a camera located above the video monitor will inherently look downwards onto the proximate conferee. Because of this, the image of the proximate conferee may appear submissive to the remote conferee. Likewise, if the camera is located below the video monitor, the image of the proximate conferee may appear grandiose to the remote conferee.

Some prior art devices have also suggested placing the cameras to one side of the video monitor. However, video monitors are generally rectangular in shape and have a longer side along the horizontal. Therefore, placing the camera to the side of the video monitor causes the camera to be located substantially off centre from the proximate conferee, such that the image of the proximate conferee may appear distant or only the profile will appear to the remote conferee.

The prior art has made several proposals in the past to increase eye contact between video conferees. For example, U.S. Pat. No. 4,928,301 issued May 22, 1990, U.S. Pat. No. 5,117,285 issued May 26, 1992, and U.S. Pat. No. 5,400,069 issued Mar. 21, 1995 propose various ways to improve eye contact between video conferees. In general, these proposals relate to alternately viewing the image and the camera, or, splitting the image of the remote conferee such that a camera may be located in the same visual path as the projected image of the remote conferee. However, these prior art devices suffer from decrease in the light intensity and degradation of both the projected image and the image captured by the camera. Furthermore, these prior art devices, some of which use beam splitters, inherently limit the field of view of both the remote conferee and the proximate conferee.

Accordingly, there is a need in the art for an apparatus and system to promote the presence of video conferees by improving eye contact. Furthermore, there is a need in the art for a device and system that can promote eye contact without degradation of the projected image or loss of light intensity. In addition, there is a need in the art for an apparatus that decreases the psychological effects caused by placement of the camera.

SUMMARY OF THE INVENTION

Accordingly, it is an object of this invention to at least partially overcome the disadvantages of the prior art. Also, it is an object of this invention to provide an improved type of videoconferencing apparatus and system that improves the sense of personal contact and reinforces the presence of both video conferees.

Accordingly, in one of its aspects, this invention resides in an apparatus for facilitating videoconferencing between a proximate video conferee and a remote video conferee, said apparatus comprising: a video monitor for displaying an image of the remote conferee; a camera for generating an image of the proximate conferee for display to the remote conferee; wherein the camera is located within an interocular distance of an anticipated displayed position of at least one eye of the remote conferee.

In a further aspect, the present invention resides in a videoconferencing apparatus comprising: a housing for housing a camera and video monitor, said camera generating an image of a proximate conferee and said video monitor displaying an image of a remote conferee; wherein the camera is located in the housing within about 4 inches of an anticipated displayed position of at least one eye of the remote conferee. In yet another aspect, the present invention provides a videoconferencing apparatus further comprising: an aligning mechanism for aligning the housing to a computer monitor, said computer monitor having a direction of view; wherein the aligning mechanism aligns the housing with respect to the computer monitor such that the directions of view of the computer monitor intersects a direction of view of the video monitor at a location near the proximate conferee.

One advantage of the present invention is that, by having the camera within the interocular distance of an anticipated displayed position of one eye of the remote conferee improves the perceived eye contact between the video conferees. Furthermore, because this results in the placement of the camera, rather than mechanical or electronic manipulation of the images, the complexity of the apparatus and device, as well as the cost, is much less. Furthermore, because there is no separate apparatus located between the camera, the video monitor and the proximate conferee, the apparatus does not cause a degradation of the image or loss of light intensity.

In a further preferred embodiment of the invention, a feedback screen for displaying the image of the proximate conferee is located near the camera. During videoconferences, the applicant has appreciated that the proximate conferee periodically desires to view their own image to see how they appear to the remote conferee. By placing the feedback screen near the video camera, each time the proximate conferee views his or her image, the eye contact between the remote conferee and proximate conferee improves because the video camera is near the feedback screen.

In a further embodiment, the apparatus comprises a rotation member for rotating the camera and video monitor. This permits the apparatus to rotate from a conventional or landscape position to a portrait position, thereby increasing the versatility of the apparatus. This permits the apparatus according to the present invention to be used in both landscape and portrait positions. This also assists the apparatus of the present invention to be used in a videoconference session where the remote conferee has a conventional videoconferencing apparatus.

A further advantage of the present invention is that the field of view of the camera is not restricted. In particular, any type of video camera can be positioned within the interocular distance of the anticipated displayed position of an eye of the remote conferee. In a preferred embodiment, an electronic camera having a large field of view could be used. In this case, the video camera could be controlled to select a portion of the field of view selected for display to the remote conferee. This can occur, for instance, in response to signals inputted by the remote conferee. Furthermore, the camera could be mounted on a ball joint or other mechanical camera direction unit for moving the camera to change the field of view.

In a further preferred embodiment, the present invention can, in one embodiment, be housed in a single housing. The housing can contain a video monitor for displaying an image of the remote conferee, a camera for generating an image of the proximate conferee, and optionally, a feedback screen, a microphone and a speaker. In one embodiment, this housing can contain a contact surface for contacting a conventional computer monitor. Accordingly, the present invention, in one embodiment, comprises a videoconferencing module that can be rested or fixed to a standard computer monitor such that the video conferees are free to refer to data or other information appearing on the computer monitor without interfering with the videoconference.

In a further preferred embodiment, the invention comprises a cover for movement from a closed position covering the camera to an open position not covering the camera. In this way, the videoconferencing unit will be closed and protected when not in use. Furthermore, this decreases uneasiness people sometimes experience when a camera is directed toward them after a videoconferencing session. Furthermore, by having the camera covered, there is no concern that a videoconference session will commence before the proximate conferee is prepared to engage in the videoconference session.

In a further preferred embodiment, the cover has a reflective surface. In this preferred embodiment, the reflective surface can be used to reflect light from a light source, such as a light source located behind the camera. In this way, light can be reflected by the reflective surface in a direction substantially the same as the direction of view of the camera and video monitor, and therefore towards the anticipated position of the proximate conferee. The reflective surface can have a diffusing effect to avoid harsh direct light illuminating the proximate conferee. The reflective surface can also increase the effective distance of the light source to the proximate conferee, thereby improving illumination.

Further aspects of the invention will become apparent upon reading the following detailed description and drawings that illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

The preferred embodiments of the present invention and its advantages can be understood by referring to the present drawings. In the present drawings, like numerals are used for like and corresponding parts of the accompanying drawings.

Figure 1:
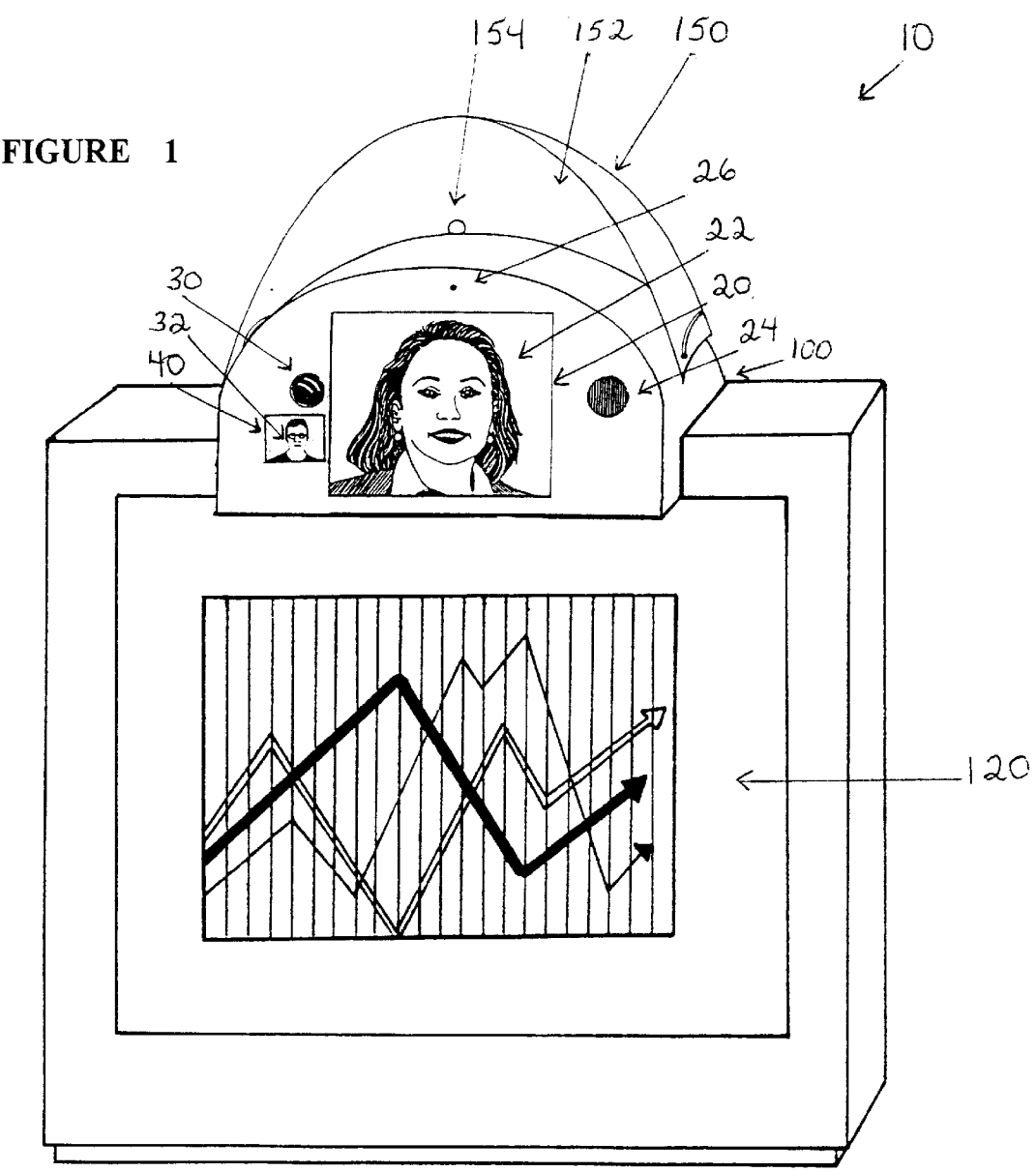
FIG. 1 shows a front view of a videoconferencing apparatus, according to one embodiment of the present invention, in contact with a computer monitor.

As shown in FIG. 1, one embodiment of the present invention relates to a videoconferencing apparatus, shown generally by reference numeral 10. The videoconferencing apparatus 10 facilitates video conferencing between at least two video conferees, which shall be referred to as a proximate video conferee and a remote video conferee. It is understood that more than two video conferees could conference at the same time.

The videoconference apparatus 10 comprises a video monitor 20 for displaying an image 22 of the remote conferee. The apparatus 10 also comprises a camera 30 for generating an image of the proximate conferee for display to the remote conferee.

In a preferred embodiment, as illustrated in FIG. 1, the apparatus 10 also comprises a feed back screen 40. The feed back screen 40 displays the image of the proximate conferee being generated by the camera 30. In this way, the proximate conferee can periodically look into the feed back screen 40 to see his or her image 32.

Figure 2:
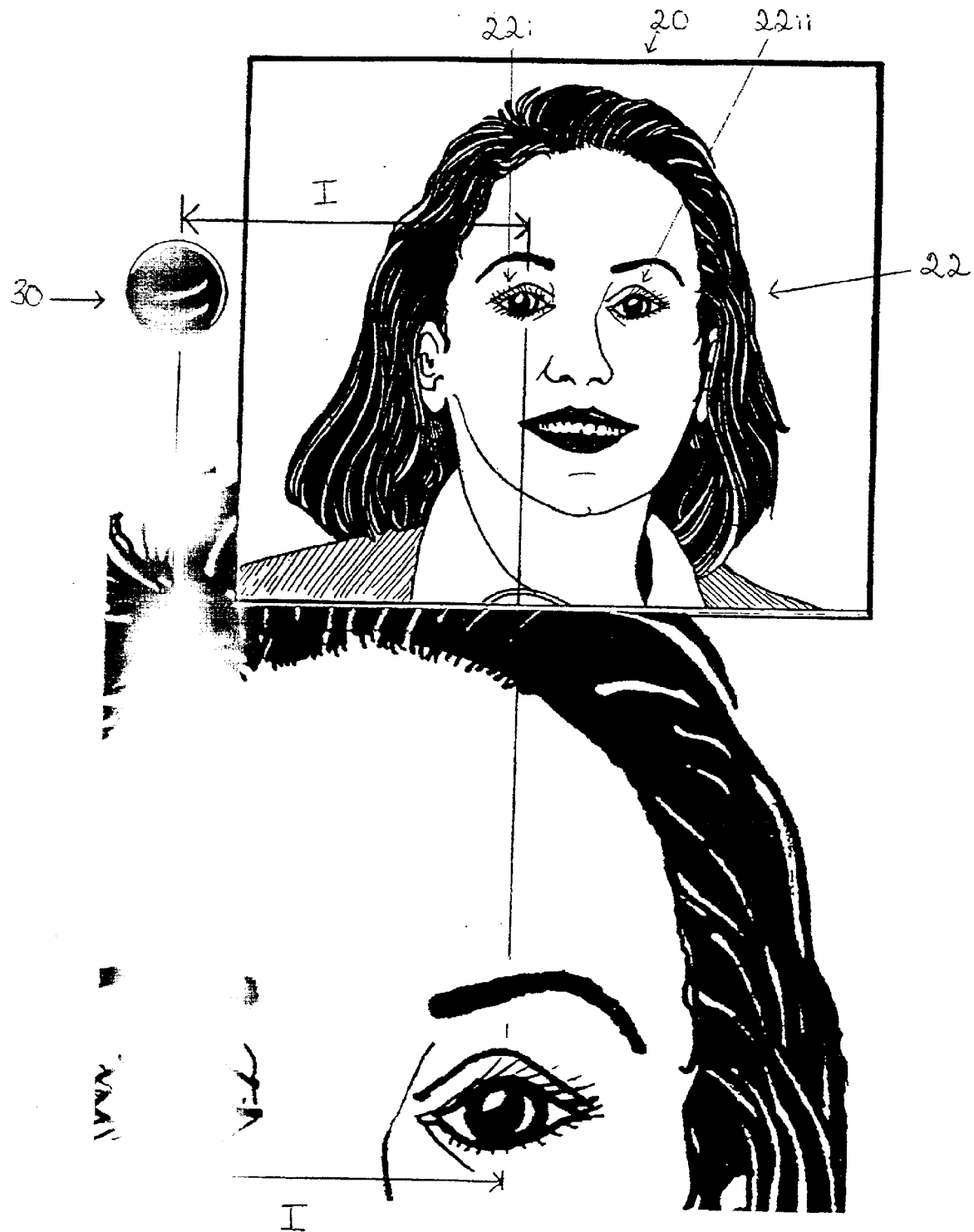
FIG. 2 illustrates the interocular distance and positioning of the camera within the interocular distance of an anticipated displayed position of at least one eye of the remote conferee.

In order to facilitate the videoconference, it is preferred that the camera 30 is within the interocular distance of an anticipated position of at least one eye 22i of the image 22 of the remote conferee. This is illustrated in FIG. 2 where the interocular distance I is illustrated at the lower portion of FIG. 2, and, the distance of the camera 30 to the anticipated displayed position of one eye 22i of the remote conferee is illustrated as being within this interocular distance.

It is understood that the interocular distance I will be the actual distance between the eyes of an average person, rather than the distance between the eyes of the image 22 of the remote conferee. In general, the interocular distance I is between 1 inch and 4 inches. More specifically, the interocular distance can be considered between 1½ and 3 ½ inches. More preferably, the interocular distance is about 2½ inches. It is understood that this is an average of the interocular distance between the eyes of an adult. Should the video conference apparatus 10 be designed specifically for children, then an interocular distance closer to the lower range of 1 to 4 inches, such as 1 inch or 1.5 inches, would be more appropriate.

In general, when two people converse in normal face to face conferencing, the eyes of one conferee scans across the face of the other conferee. However, in general, when eye contact occurs, one conferee will be looking into one of the eyes of the other conferee. Because of this, having eye contact which is separated by no more than the interocular distance I, namely 1 inch to 4 inches, more preferably 1½ to 3½ inches and most preferably 2½ inches, would not be distinguished by the conferee, thereby enhancing the videoconference.

Figure 3:
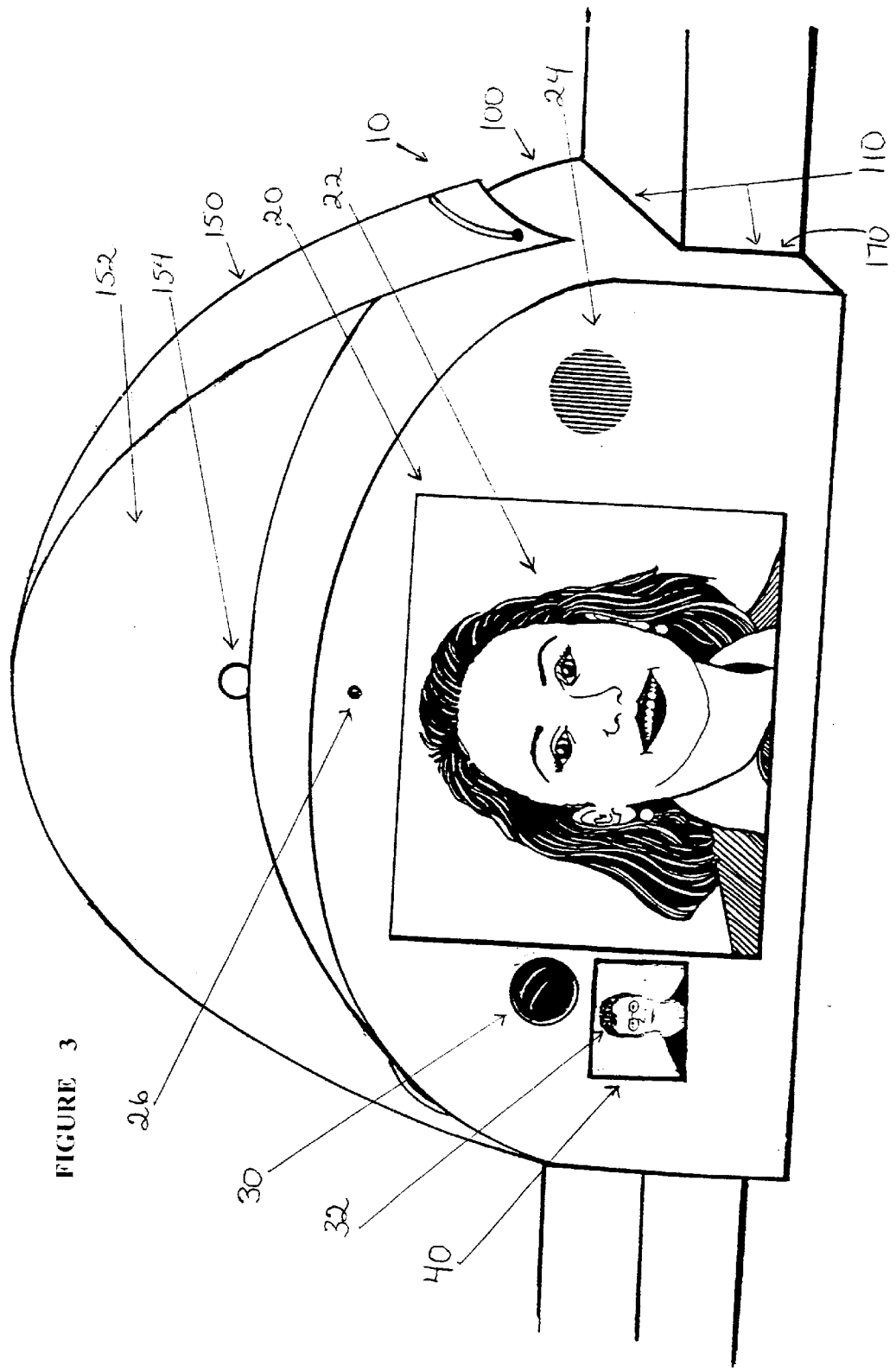
FIG. 3 shows a more detailed front view of the videoconferencing apparatus shown in FIG. 1.
Figure 4A:
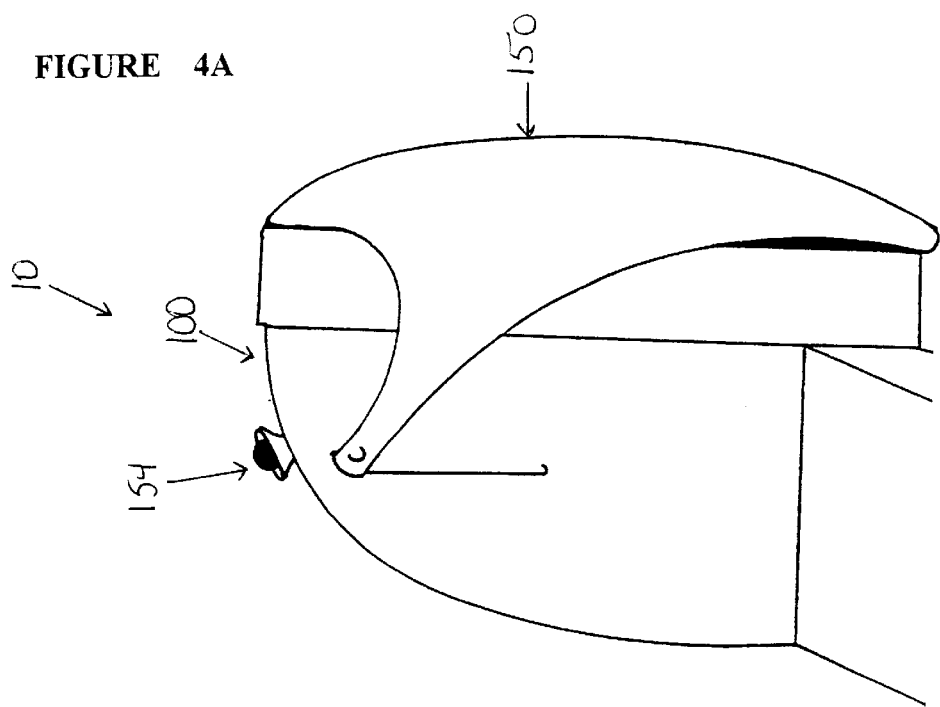
FIGS. 4a and 4b illustrate the cover of the videoconferencing apparatus in the closed and open positions respectively, according to a preferred embodiment of the present invention.
Figure 4B:
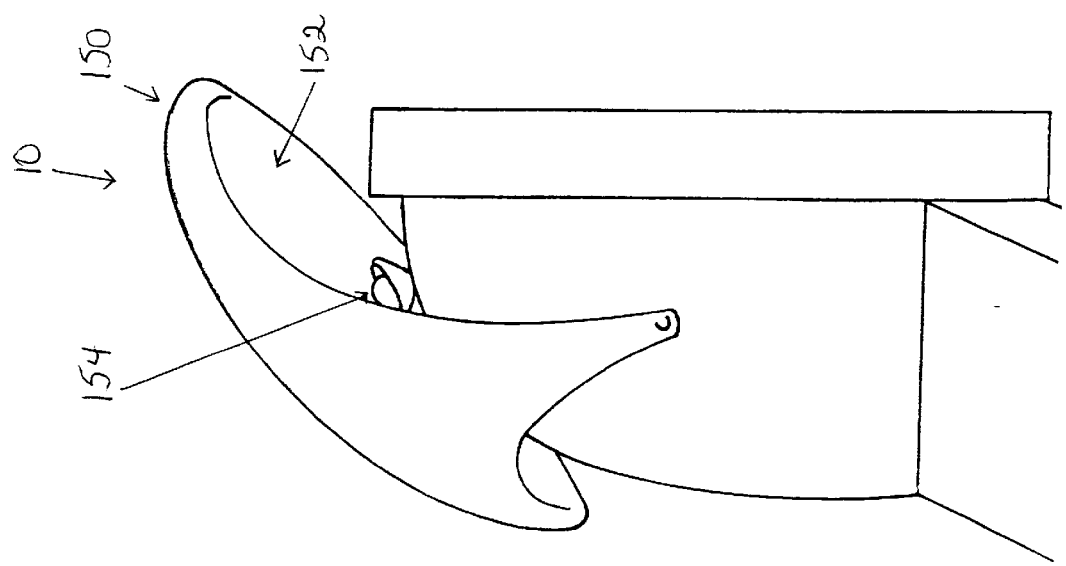

Accordingly, by having the camera 30 within the interocular distance I of the anticipated displayed position of at least one eye 22i of the image 22 of the remote conferee will give the impression of eye to eye contact between the video conferees when the proximate conferee views the image 22 of the remote conferee on the video monitor 20. This impression of eye to eye contact is further enhanced if the camera 30 is in a location that is substantially aligned with the anticipated displayed position of both eyes 22i and 22ii of the remote conferee, as also illustrated in FIGS. 1, 2, 3 as well as the embodiment shown in FIG. 6C. In this way, the eyes of the proximate conferee will be in line and within the interocular distance of the camera 30. This is similar to the manner in which one person views another person during a face to face meeting.

In a preferred embodiment, the feed back screen 40 will be a distance from the feed back screen 40 to the camera 30 which is within the interocular distance I. More preferably, the feed back screen 40 will be substantially adjacent the camera 30. This is the case, in part, because remote conferees frequently view their image 32 in the feed back screen 40. Accordingly, by having the feed back screen 40 within the interocular distance I from the camera 30, and preferably substantially adjacent the camera 30, the perception of eye contact will be greater each time the remote conferee views their image 32 on the feed back screen 40, because the eyes of the proximate conferee will be directed substantially towards the camera 30 each time the proximate conferee glances at the feed back screen 40.

As illustrated in FIGS. 1 and 3, in one embodiment, the apparatus 10 comprises a housing 100 which houses the camera 30 and the video monitor 20. The housing 100 may also house other components for facilitating the video conferencing. For instance, as illustrated in FIGS. 1 and 3, the housing 100 may also house the feed back screen 40, a speaker 24 and a microphone 26. The speaker 24 generates audible sounds corresponding to the audio signals As received from the remote conferee. Similarly, the microphone 26 receives audible sounds from the proximate conferee and generates audio signals to be transmitted to the remote conferee. As such, the embodiment having a housing 100 as illustrated in FIGS. 1 and 3 can be considered to be a video conferencing module having all the components for facilitating video conferencing and capable of being rested on a computer monitor or other object.

As also shown in FIGS. 1, 3 and 4A and 4B, the housing 100 preferably has a cover 150. The cover 150 can move from a closed position, shown in FIG. 4A, to an open position, shown in FIG. 4B. In this way, the cover 150 can cover the camera 30 and monitor 20, as well as the other components such as the speaker 24 and microphone 26, to protect them when the apparatus 10 is not in use. Furthermore, video conferees sometimes experience uneasiness when a camera 30 is directed toward them after a video conferencing session. By covering the camera 30 with the cover 150, this uneasiness can be decreased and possibly avoided. Furthermore, by covering the camera 30 with the cover 150, the proximate conferee can ensure that a videoconferencing session does not start before they are prepared.

In a further preferred embodiment, in order to increase illumination of the proximate conferee, the apparatus 10 comprises a light source, shown generally by reference numeral 154 in FIGS. 1, 3, 4A and 4B. The light source 154 assists in illuminating the proximate conferee in order to facilitate the videoconferencing session. In a preferred embodiment, the inside surface of the cover 150 has a reflective surface 152. When the cover 150 is in the open position, the reflective surface reflects light from the light source 154. Preferably, the reflective surface 152 reflects lights in substantially a direction $D_{VMC}$ of view of the monitor 20 and camera 30 which also likely corresponds to the position of the video conferee.

The reflective surface 152 can have a diffusing effect on the light source 154 to avoid harsh direct light illuminating the proximate conferee. In addition, the reflective surface 152 increases the effective distance of the light source 154 to the proximate conferee, which improves illumination and may accentuate the diffusing effect. The reflective surface 152 also permits the light source 154 to be located behind and away from the camera 30 such that spurious light from the light source 154 does not affect the camera 30 and degrade the image being generated by the camera 30. Similarly, the light source 154 will preferably be located behind and away from the video monitor 20 so as not to affect or degrade the image 22 of the remote conferee. The illumination of the proximate conferee by the light source 154 reflecting on the reflective surface 152 is illustrated best in FIG. 5.

Figure 5:
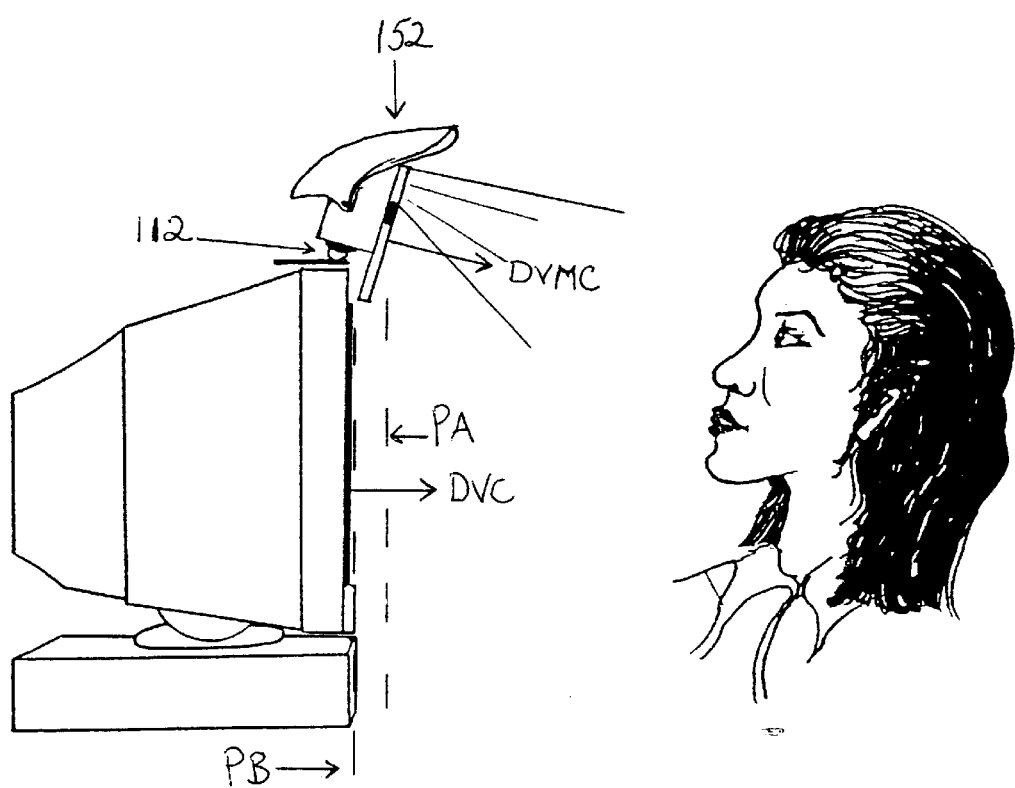
FIG. 5 illustrates light being reflected from a light source located behind the camera and video monitor.

FIG. 5 also illustrates the housing 100 having the video monitor 20 and camera 30 aligned with the computer monitor 120. Preferably, the direction of view $D_{VC}$ of the computer monitor 120 will substantially intersect the direction of view $D_{VMC}$ of the monitor 20 and camera 30 at a location near the anticipated position of the proximate conferee. In this way, the proximate conferee will be able to view the computer monitor 120 as well as the video monitor 20, and be seen by the camera 30, at the same time. While, in this embodiment, the speaker 24 and microphone 26 will also be directed towards the proximate conferee, and in the same direction as the direction of view $D_{VC}$ of the monitor 20 and camera 30, this is not as critical as the direction of view $D_{VMC}$ of the monitor 20 and camera 30.

In order to assist in aligning the direction of view $D_{VMC}$ of the monitor 20 and camera 30 to substantially intersect direction of view $D_{VC}$ of the computer monitor 120, in a preferred embodiment, the housing 100 comprises a contact surface 110, shown best in FIG. 3. The contact surface 110 acts as an aligning mechanism 170 to assist in the aligning the housing 100 with the computer monitor 120. In particular, the contact surface 110 of the housing 100 contacts the computer monitor 120 such that the video monitor 20 and camera 30 have a direction of view $D_{VMC}$ substantially similar to the direction of view $D_{VC}$ of the computer monitor 120.

More preferably, the video monitor 20 and camera 30 are closer to the remote conferee than the computer monitor. To accomplish this, the contact surface 110 of the aligning mechanism 170 aligns the video monitor 20 and the camera 30 along a plane, shown by the dashed line $P_A$ in FIG. 5, which is displaced from a plane, shown by the dashed line $P_B$ in FIG. 5, of the computer monitor 120 in the direction $D_{VC}$ of view of the computer monitor 120.

More preferably, the aligning mechanism 120 comprises a pivoting member 112, shown in FIG. 5, such that the camera 30 and video monitor 20 are tiltably mounted to the contact surface 110. By rotating the pivoting member 112, about an axis parallel to the plain $P_B$ of the camera 30 and video monitor 20, the camera 30 and video monitor 20 can be better aligned with the proximate conferee such that the direction of view $D_{VMC}$ of the video monitor 20 and camera 30 may substantially intersect the direction of view of the computer monitor $D_{VC}$ preferably at a location near the video conferee. It is understood that the camera 30 and video monitor 20 are aligned with the plain $P_B$ before they have been tilted by the pivoting member 112.

In this way, the video conferee can view the computer monitor 120 at the same time as they view the camera 30 and video monitor 20. Preferably, as discussed above, the video monitor 20 and camera 30 will be closer to the video conferee than the computer monitor 120. This assists the video conferee in viewing the image 22 of the remote conferee on the video monitor 20. This also assists the camera 30 in generating an image of the proximate conferee for display to the remote conferee. Furthermore, by having a camera 30 closer to and directed at the video conferee, it is more likely that the video camera 30 will capture a better image of the video conferee, and, that the image will fill more of the screen on the video monitor 20 of the remote conferee. This will assist in viewing the video conferees in the video monitor 20. This will also assist in placing the anticipated displayed position of at least one eye 22i of the remote conferee closer to the edge of the video monitor 20 and therefore closer to the camera 30, thereby improving eye contact.

It is understood that the alignment mechanism 170 can assist in aligning the camera 30 such that the image displayed at the remote video monitor will have the displayed eye 22i of the remote conferee 22 displayed at an anticipated displayed position, as shown in FIG. 2. However, to ensure that the anticipated display position of at least one eye 22i of the remote conferee is within the interocular distance, it is possible that the interocular distance I be measured from the middle of the camera 30 to the middle of the video monitor 20. In this case, the anticipated displayed position of at least one eye 22i of the remote conferee would be taken as being within ½ of the video monitor 20 and therefore within the midpoint of the video monitor 20. In a further preferred embodiment, the apparatus 10 recognizes the facial features of the video conferee and manipulates the image 22 of the remote conferee such that the image 22 of at least one eye 22i is within the interocular distance I with the camera 30. For instance, the image 22 may be mapped or manipulated such that the camera 30 is substantially aligned with the image of the eyes 22i and 22ii and the camera 30 is within the interocular distance I of the displayed position of at least on eye 22i.

Figures 6A, 6B, 6C:
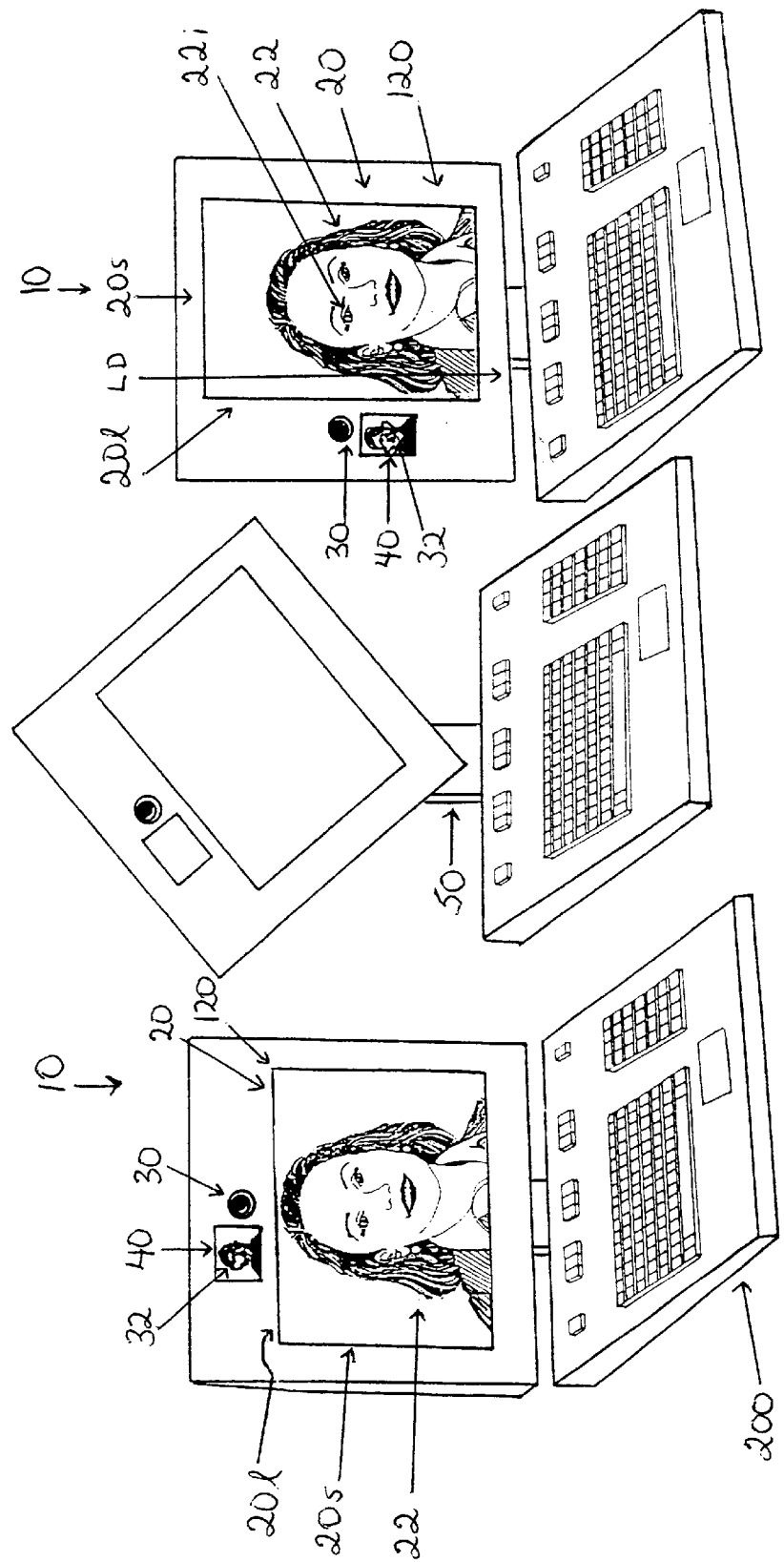
FIGS. 6a, 6b and 6c illustrate a perspective view at various stages of rotation of a videoconferencing apparatus according to a further embodiment of the present invention.

In a further embodiment, shown in FIGS. 6A, 6B and 6C, the apparatus 10 is not present in a separate housing 100, but rather is incorporated in a computer 200. In this embodiment, the computer monitor 120 also acts as the video monitor 24 for the teleconferencing apparatus 10 and the image 22 of the remote conferee will appear on the computer monitor 120 as illustrated in FIG. 6A and 6C, in the video monitor 20. When not used for videoconferencing, the computer monitor 120 will be used by the computer 200 in the normal fashion.

FIG. 6A illustrates the computer monitor 120 of the computer 200 in a landscape position, where the camera 30 is located above the monitor 20 and the longer side 201 of the computer monitor 120 is substantially horizontal. Also, feed back screen 40 displaying an image 32 of the proximate conferee is located above the displayed image 22 of the remote conferee and not substantially aligned with the displayed position of the eyes 22i and 22ii. Such a position would be useful to videoconference with a remote conferee that has a videoconferencing apparatus where the camera 30 is not located within the interocular distance of an anticipated display position of at least one eye 22i of the remote conferee and, is not located at eye level. Furthermore, the landscape position, illustrated in FIG. 6A, is common in prior art devices and also common in computer monitor 120 to display text and images, but suffers when used for videoconferencing for a number of reasons, such as that the camera 30 is located above the image 22 of the remote conferee, rather than at eye level and within the interocular distance I.

In a preferred embodiment, the present invention, comprises a rotating member, shown generally by reference numeral 50, for rotating the computer monitor 120, which acts as a video monitor 20 in this embodiment, along with the camera 30 and feedback screen 40 about 90° as illustrated in FIGS. 6A, 6B and 6C. In FIG. 6C, the computer monitor 120, which is acting as the video monitor 20, has been rotated 90° and is now in a portrait position, where the long side 201 is substantially vertical and the short side 20s is substantially horizontal. This facilitates video conferencing in that the image 20 of the remote conferee is now displayed along the longitudinal axis Ld of the video monitor 20. In this way, the anticipated displayed position of at least one eye 20i of the remote conferee will be closer to the edge of the video monitor 20, and therefore closer to the camera 30. This arrangement assists in having the anticipated displayed position of at least one eye 20i of the remote conferee within the interocular distance I of the camera 30. This arrangement also assists in having the camera 30 at about the same longitudinal position along the longitudinal axis Ld as the anticipated displayed position of the eyes 22i and 22ii of the remote conferee to improve eye contact. The rotating member 50 used to rotate the computer monitor 120 acting as a video monitor 20 can be any type of know-rotating member, such as a ball and socket joint (not shown).

Figure 7:
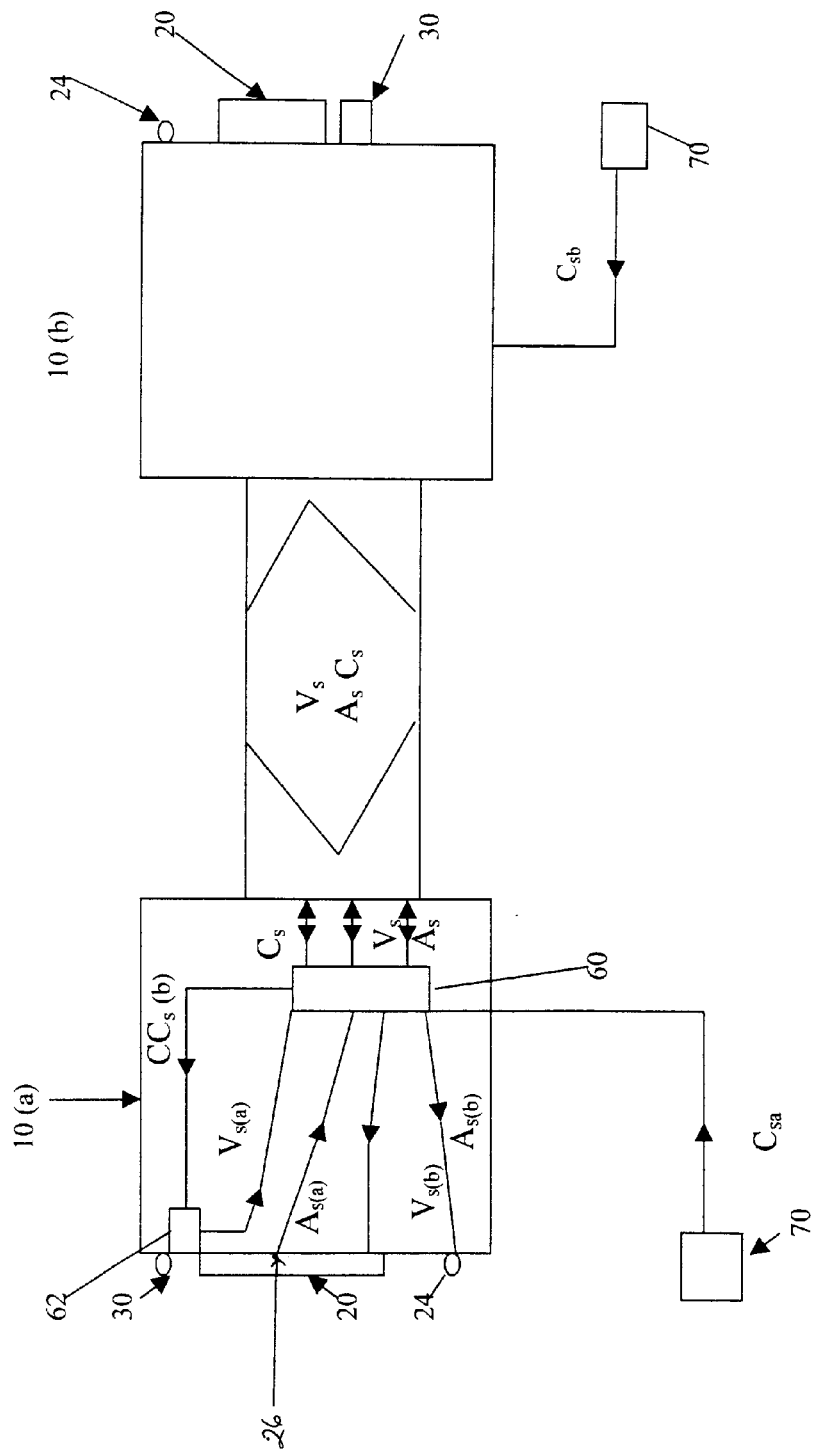
FIG. 7 illustrates a schematic diagram showing the electronic components of the videoconferencing according to one embodiment of the present invention.

Internal components of the videoconferencing apparatus are illustrated in FIG. 7. FIG. 7 shows two separate video apparatuses 10, identified by reference numerals 10(a) and 10(b). The two apparatuses 10(a) and 10(b) send video signals $V_s$, audio signals $A_s$ and control signals $C_s$ between each other. The signals $V_s$, $A_s$ and $C_s$ can be sent by any known means, such as by telephone wire, high speed cable, wireless transmission and any other known manner for transmitting signals such as video signals $V_s$, audio signals $A_s$ or control signals $C_s$. Furthermore, it is understood that the video signals $V_s$, audio signals $A_s$ and control signals $C_s$ need not each be transmitted together, although it would be preferable to do so. Furthermore, it is understood that if the signals $V_s$, $A_s$ and $C_s$ are transmitted together, the relative band width between each of the signals may change, as required, in order to most efficiently send the video signals $V_s$, audio signals $A_s$ and control signals $C_s$. It is understood that other data or information may be transmitted between the video conferees at the videoconferencing apparatus 10(a) and 10(b), including data signals $D_s$ (not shown) transmitting information between computers or facsimile transmission devices.

The internal components of apparatus 10(a) will now be discussed. It is understood that apparatus 10(b) will have corresponding internal components, but for clarity, these are not illustrated in FIG. 7 and only the function of the components in apparatus 10(a) will be discussed. It is also understood that these electrical components, or equivalents thereto, would be present in either the embodiment shown in FIG. 3, where the apparatus 10 is a module contained within a housing 100, as well as the embodiment shown in FIGS. 6A, 6B and 6C, where the apparatus 10 is hosted by a computer 200. The only difference being that, in the embodiment illustrated in FIGS. 6A, 6B and 6C, the function of the various components could be performed by the computer 200.

In a preferred embodiment, the apparatus 10(a) comprises a controller 60 which essentially controls the functioning of the apparatus 10(a). For instance, the controller 60 would control the reception and transmission of the video signals $V_s$, audio signals $A_s$ and control signals $C_s$ which are transmitted and received by the apparatus 10(a). The controller 60 may also preferably comprise an analogue to digital converter in order to convert any of the signals $V_s$, $A_s$ and $C_s$ from analogue to digital or from digital to analogue, as required. The controller 60 may also comprise modulator/demodulator or be capable of interfacing with these types of components.

The controller 60 may also comprise image recognition and manipulation software to recognize the image of the video conferee and the video signal $V_S$ and manipulate the video signal $V_s$ to permit the image 22 of the remote conferee to be displayed on the video monitor 20 such that the image 22 appears in the middle of the video monitor and/or at least the image of one eye 22i will be within the interocular distance of the camera 30. The controller 60 could also be programmed to manipulate the video signal $V_s$ such that the image 22 of the remote conferee is displayed on the video monitor 20 such that the displayed image of the eyes 22i and 22ii are substantially aligned with the position of the camera 30 in the apparatus 10(a).

The controller 60 will also send and receive the control signals $V_s$, $A_s$ and $C_s$ to the various components of the apparatus 10(a), such as the video monitor 20, the speaker 24, the microphone 26 and the camera 30. For instance, the controller 60 may receive from the camera 30 the video signals $V_{sa}$ generated by the camera 30 and representing an image 22 of the video conferee using apparatus 10(a). The controller 60 will then transmit the video signal $V_{sa}$ representing the image 22 of the video conferee using apparatus 10(a) to the apparatus 10(b) for display on the video monitor 20 to the video conferee using the apparatus 10(b).

The control unit 60 also sends the video signal $V_{s(b)}$ representing the image 22 of the video conferee using apparatus 10(b) to the video monitor 20. The video monitor 20 will then display the image 22 of the remote conferee using apparatus 10(b) as represented by the video signal $V_{s(b)}$.

Likewise, the controller 60 may also send to the speaker 24 audio signals $A_{s(b)}$, which are the audio signals $A_{s(b)}$ transmitted from the remote video conferee using apparatus 10(b). The speaker 24 receives the audio signals $A_{s(b)}$ and generates audible sounds corresponding to the audio signals $A_{s(b)}$. Similarly, microphone 26 receives audible sounds from the vicinity of apparatus 10(a) and converts these audible sounds to audio signals $A_{s(a)}$ and may send these audio signals $A_{s(a)}$ to the controller 60. The controller 60 then transmits the audio signals $A_s$, comprising the audio signals $A_{s(a)}$ to the apparatus 10(b). The apparatus 10(b) then converts the audio signals $A_{s(a)}$ to audible sound by speaker 24 on apparatus 10(b)

In a preferred embodiment, a separate input/output unit 70 is present for sending control signals $C_{sa}$ from the video conferee using apparatus 10(a) to the controller 60. It is understood that the input/output unit 70 is an optional unit and would be used merely to generate and send control signal $C_{sa}$ from the video conferee operating at apparatus 10(a) to the controller 60. It is also understood that the input/output unit 70 may be formed by the computer 200 such that the control signals $C_s$, or the data signals $D_s$ (not shown) are generated by the computer 200. Depending on the control signals $C_{sa}$, they may be used by the controller 60 or sent to apparatus 10(b).

For instance, in a preferred embodiment, the apparatus 10(a) and 10(b) comprise camera direction units 62 which move the associated camera 30 to change the field of view in response to control signals $C_s$, and in particular the camera control signal $CC_s$ which form a part of the control signals $C_s$. In the preferred embodiment, the camera direction unit 62 moves the camera 30 to change the field of view electronically by selecting a different portion of the field of view of the camera 30 to transmit. It is understood that the camera control signal $CC_{s(b)}$ are a subset of the control signal $C_{sb}$ generated by the input/output unit 70 connected to the apparatus 10(b).

Accordingly, the input/output unit 70 at apparatus 10(a) would generate control signals $C_{sa}$ to control the movement of camera 30 at apparatus 10(b). These control signals $C_{sb}$ would be transmitted by controller 60 to apparatus 10(b) where the controller 60 (not shown) at apparatus 10(b) would send camera signals $CC_{s(a)}$ (not shown) to change the field of view of the camera 30 at apparatus 10(b). In this way, the proximate video conferee at apparatus 10(a) can control aspects of apparatus 10(b), such as the field of view of the camera 30. Similarly, the apparatus 10(b) could have an attention getting device, such as a light or moving hand (not shown), and control signals $C_{sa}$ from input/output 70 at apparatus 10(a) could control these devices (not shown) at apparatus 10(b).

Accordingly, as illustrated in FIG. 7, the controller 60 controls the apparatus 10(a). A corresponding controller 60 controls apparatus 10(b) in a similar manner in order to transmit and receive the audio signals $A_s$, video signals $V_s$ and control signals $C_s$ to facilitate video conferencing between the video conferee using apparatus 10(a) and the video conferee using the apparatus 10(b).

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments that are functional, electrical or mechanical equivalents of the specific embodiments and features that have been described and illustrated herein.

The embodiments of the invention in which an exclusive property or privilege is claimed are defined as follows:

1. An apparatus for facilitating video conferencing between a proximate video conferee and a remote video conferee, said apparatus comprising:
   a video monitor for displaying an image of the remote conferee's facial features;
   a camera for generating an image of the proximate conferee for display to the remote conferee;
   a rotation member for rotating the video monitor, from a landscape position, where a longer side of the video monitor is substantially horizontal, to a portrait position, where the longer side is substantially vertical;
   wherein the camera is fixed to the video monitor along the longer side;
   wherein the rotation member rotates the camera from a position above the image of the remote conferee to a position beside the image of the remote conferee, such that the camera is located within an interocular distance of an anticipated displayed position of at least one eye of the remote conferee when the video monitor is in the portrait position.

2. The apparatus as defined in claim 1 further comprising:
   a feed back screen for displaying the image of the proximate conferee being generated by the camera; and
   wherein the distance from the feed back screen to the camera is within the interocular distance.

3. The apparatus as defined in claim 2 wherein the feed back screen is substantially adjacent the camera.

4. The apparatus as defined in claim 1 wherein the interocular distance is between 1 inch and 4 inches.

5. The apparatus as defined in claim 4 wherein the interocular distance is about 2.5 inches.

6. The apparatus as defined in claim 1 further comprising:
   a control unit for controlling a field of view of the camera.

7. The apparatus as defined in claim 6 further comprising:
   a camera direction unit for moving the camera to change the field of view;
   wherein said camera direction unit moves the camera in response to control signals received from the control unit.

8. The apparatus as defined in claim 7 wherein the control unit generates the control signals in response signals inputted by the remote conferee and received by the apparatus.

9. The apparatus as defined in claim 1 further comprising:
   a housing for housing the camera and the video monitor.

10. The apparatus as defined in claim 1 wherein when the video monitor is in the portrait position the camera is located within the interocular distance of the anticipated displayed position of at least one eye of the remote conferee and substantially aligned with the anticipated displayed position of both eyes of the remote conferee.

11. A videoconferencing apparatus comprising:
    a housing for housing a camera and video monitor, said camera generating an image of a proximate conferee and said video monitor displaying an image of a remote conferee;
    a rotation member for rotating the video monitor, from a landscape position, where a longer side of the video monitor is substantially horizontal, to a portrait position, where the longer side is substantially vertical;
    wherein the camera is fixed to the video monitor along the longer side;
    wherein the rotation member rotates the camera from a position above the image of the remote conferee to a position beside the image of the remote conferee, such that in the portrait position, the camera is located in the housing within about 4 inches of an anticipated displayed position of at least one eye of the remote conferee.

12. A videoconferencing apparatus as defined in claim 11 further comprising:
    an aligning mechanism for aligning the housing to a computer monitor, said computer monitor having a direction of view;
    wherein the aligning mechanism aligns the housing with respect to the computer monitor such that the direction of view of the computer monitor intersects a direction of view of the video monitor at a location near the proximate conferee.

* * * * *